(12) United States Patent
Zmek et al.

(10) Patent No.: US 11,384,905 B2
(45) Date of Patent: Jul. 12, 2022

(54) PROTECTIVE VALVE RING

(71) Applicant: GCE Holding AB, Malmö (SE)

(72) Inventors: Karel Zmek, Malmö (SE); Zdenek Firych, Malmö (SE); Petr Jehlicka, Malmö (SE); Gareth Pemberton, Malmö (SE)

(73) Assignee: GCE HOLDING AB, Malmö (SE)

(*) Notice: Subject to any disclaimer, the term of this patent is extended or adjusted under 35 U.S.C. 154(b) by 197 days.

(21) Appl. No.: 16/623,025

(22) PCT Filed: Jun. 21, 2017

(86) PCT No.: PCT/EP2017/065182
§ 371 (c)(1),
(2) Date: Dec. 16, 2019

(87) PCT Pub. No.: WO2018/233821
PCT Pub. Date: Dec. 27, 2018

(65) Prior Publication Data
US 2021/0148515 A1 May 20, 2021

(51) Int. Cl.
F17C 13/04 (2006.01)
F16K 5/04 (2006.01)

(52) U.S. Cl.
CPC ............ *F17C 13/04* (2013.01); *F16K 5/0428* (2013.01); *F17C 2201/0109* (2013.01);
(Continued)

(58) Field of Classification Search
CPC ....... F17C 2205/0308; F17C 2260/037; Y10T 137/5762; Y10T 137/7062
See application file for complete search history.

(56) References Cited

U.S. PATENT DOCUMENTS 3,722,533 A * 3/1973 Connolly ................ F16K 27/12
137/382
4,332,331 A * 6/1982 Fawley ................ F17C 13/002
137/382
(Continued)

FOREIGN PATENT DOCUMENTS

CA 2558174 A1 2/2008
CN 102951047 A 3/2013
(Continued)

OTHER PUBLICATIONS

Office Action for Chinese Patent Application No. 201780091954.X dated Mar. 11, 2021 with English translation, 17 pages.
(Continued)

*Primary Examiner* — Kevin F Murphy
(74) *Attorney, Agent, or Firm* — Edell, Shapiro & Finnan, LLC

(57) ABSTRACT

The invention relates to a protective valve ring (1) for an oxygen gas cylinder (3). The protective valve ring (1) comprises a body (4) adapted to enclose an outlet (5) of a cylinder valve (2). The body (2) comprises an incombustible and heat absorbing material, and has an internal shaping adapted to guide any potential oxygen gas leak away from inflammable parts of the gas cylinder (3). The invention also relates to a shut-off valve (2) for controlling flow of a pressurised gas and a method for attaching a protective valve ring (1) to a shut-off valve (2) of an oxygen gas cylinder (3).

20 Claims, 5 Drawing Sheets

(52) U.S. Cl.
CPC ............. *F17C 2205/0308* (2013.01); *F17C 2205/0323* (2013.01); *F17C 2205/0382* (2013.01); *F17C 2221/011* (2013.01); *F17C 2260/037* (2013.01); *Y10T 137/5762* (2015.04); *Y10T 137/7062* (2015.04)

(56) References Cited

U.S. PATENT DOCUMENTS

| | | | | |
|---|---|---|---|---|
| 4,549,568 | A | * | 10/1985 | Trail .................... F17C 13/003 137/382 |
| 4,678,003 | A | * | 7/1987 | Griffin .................. F16K 35/10 137/382 |
| 4,944,424 | A | | 7/1990 | Wood, Jr. |
| 5,158,204 | A | * | 10/1992 | Martrich ................ F17C 13/06 220/727 |
| 5,160,065 | A | * | 11/1992 | Libes .................... F17C 13/123 220/724 |
| 5,638,858 | A | * | 6/1997 | Gettinger ............... F16K 27/12 137/382 |
| 6,003,540 | A | * | 12/1999 | Bruni ................... F17C 13/123 137/312 |
| 6,685,061 | B2 | | 2/2004 | Wolf et al. |
| 7,448,402 | B2 | * | 11/2008 | Martrich ............... F17C 13/123 137/15.11 |
| 2002/0070236 | A1 | | 6/2002 | Wolf et al. |

FOREIGN PATENT DOCUMENTS

| | | |
|---|---|---|
| CN | 104819380 A | 8/2015 |
| CN | 210729110 U | 6/2020 |
| DE | 102013007513 A1 | 11/2014 |
| WO | 2007042879 A2 | 4/2007 |

OTHER PUBLICATIONS

International Search Report and Written Opinion for International Application No. PCT/EP2017/065182 dated Oct. 27, 2017, 5 pages.
Office Action for Russian Patent Application No. 2019142450/12 (082711) dated Sep. 16, 2020 with English translation, 10 pages.
Office Action for Chinese Patent Application No. 201780091954.X dated Sep. 17, 2021 with English translation, 18 pages.
Office Action for Chinese Patent Application No. 201780091954.X dated Dec. 16, 2021 with English translation, 19 pages.
National Aeronautics and Space Administration, Safety Standard For Oxygen and Oxygen Systems: Guidelines for Oxygen System Design, Materials Selection, Operations, Storage, and Transportation, Office of Safety and Mission Assurance, Jan. 1996, 288 pages.

* cited by examiner

PROTECTIVE VALVE RING

TECHNICAL FIELD

The invention relates to protective valve ring for an oxygen gas cylinder, a shut-off valve for controlling flow of a pressurised gas and a method for attaching a protective valve ring to a shut-off valve of an oxygen gas cylinder.

BACKGROUND ART

Oxygen gas cylinders can cause ignitions and subsequent fires. Such ignitions typically occur at the cylinder valve. Often they are caused by contaminates being introduced into the gas cylinder and then impacting inside the cylinder valve. When this occurs, the ignition and subsequent fire from the valve can be highly destructive, causing significant damages.

Shut-off valves are commonly used as cylinder valves for compressed gases. One example of such a valve is disclosed in DE 103 54 299 A1. However, there are several problems associated with known shut-off valves. For example, immediately after opening of the shut-off valve, the gas has a high speed. This may lead to particle impact ignition when the gas rapidly reaches non-pressurised areas as the gas may captive particles that, if they impact on some surface, may cause ignition as their kinetic energy is converted to heat.

Another problem which may arise is that adiabatic compression caused by the opening of the shut-off valve and gas entering non-pressurised areas may lead to increase in temperature of the gas for a moment. This increase in temperature may in some cases lead to the ignition of components. In particular, this is the case for components having a low auto-ignition temperature.

The above described problems particularly occur for shut-off valves used with highly oxidised gases, that is, gases having a higher share of oxygen than air, because higher oxygen content increase the probability of ignition.

There is thus a need for improvements relating to safety when it comes to the handling of oxygen gas cylinders and specifically the handling of the cylinder valves used in connection thereto.

SUMMARY OF THE INVENTION

It is an objective of the present invention to provide an improvement of the above technique and prior art. More particularly, it is an objective of this invention to provide a safety device for cylinder valves which mitigate, alleviate or eliminate one or more of the above-identified problems.

According to a first aspect, these and other objects, and/or advantages that will be apparent from the following description of embodiments, are achieved, in full or at least in part, by a protective valve ring for an oxygen gas cylinder. The protective valve ring comprises a body adapted to enclose an outlet of the cylinder valve. The body comprises an incombustible and heat absorbing material, and an internal shaping adapted to guide a potential oxygen gas leak away from inflammable parts of the gas cylinder.

This is advantageous in that the protective valve ring nullifies the start of the fire in such a manner that the fire does not propagate. The protective valve ring both redirects the flames and absorbs the heat of the fire. In particular, it protects the plastic guard from the flames of the fire, this greatly reduces the fuel available to the fire. Effectively the protective ring provides a method of a controlled ignition.

In other words, the protective ring works as both a heat sink and a system to redirect the flames of ignition. As a heat sink, the energy from the fire is absorbed. The design of the ring is such that it is sufficient to absorb a fire involving the whole of the cylinder with the ring also being light weight and low cost. The design of the ring has specific internal shaping to optimize the protection the ring provides in redirecting the flames and absorbing heat.

The internal shaping may comprise grooves arranged on an inner wall surface of the body. Specifically, the internal shaping may comprise a first groove extending along the inner circumference of the body, and at least one second groove extending from a bottom portion of the body in the axial direction thereof to the first groove of the body. The first groove and the at least one second groove are thereby in gas communication with each other. This way, any potential oxygen leak from the cylinder valve will be guided up through the at least one second groove, into the first groove, and away from inflammable parts of the gas cylinder.

The internal shaping may comprise abutting surfaces for communication with the cylinder valve. The abutting surfaces are made from a heat absorbing material and adapted to lead heat away from exposed parts of the gas cylinder.

The body of the protective valve ring may be solid when it is applied to the valve upon manufacture of the same. If the protective valve ring is to be applied on products already in operation it is preferably may in a two-part form. In this case, the body may be made from a first part and a second part, wherein one end of the first part is hinged together with one end of the second part. The other end of the first part may be connectable to the other end of the second part by means of a pin element or a snap lock.

According to a second aspect, these and other objects are achieved, in full or at least in part, by a shut-off valve for controlling flow of a pressurised gas. The shut-off valve comprises a body defining a passage extending between a gas inlet channel and a gas outlet channel, and a sealing element arranged to, in a first position, close the passage, and in a second position, open the passage to allow gas to flow between the gas inlet channel and the gas outlet channel through the passage. The shut-off valve further comprises a protective valve ring according to the features above which is attached an outlet of the gas outlet channel.

According to a third aspect, these and other objects are achieved, in full or at least in part, by a method for attaching a protective valve ring to a shut-off valve of an oxygen gas cylinder. The protective valve ring comprises a body adapted to enclose an outlet of the cylinder valve. The body comprises internal shaping adapted to guide a potential oxygen gas leak away from inflammable parts of the gas cylinder. The method comprises the steps of arranging a first part and a second part of the body around the outlet of the cylinder valve, wherein one end of the first part is hinged together with one end of the second part, and locking the other end of the first part together with the other end of the second part by means of a pin element or a snap lock.

Effects and features of the second and third aspects of the present invention is largely analogous to those described above in connection with the first aspect the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1:
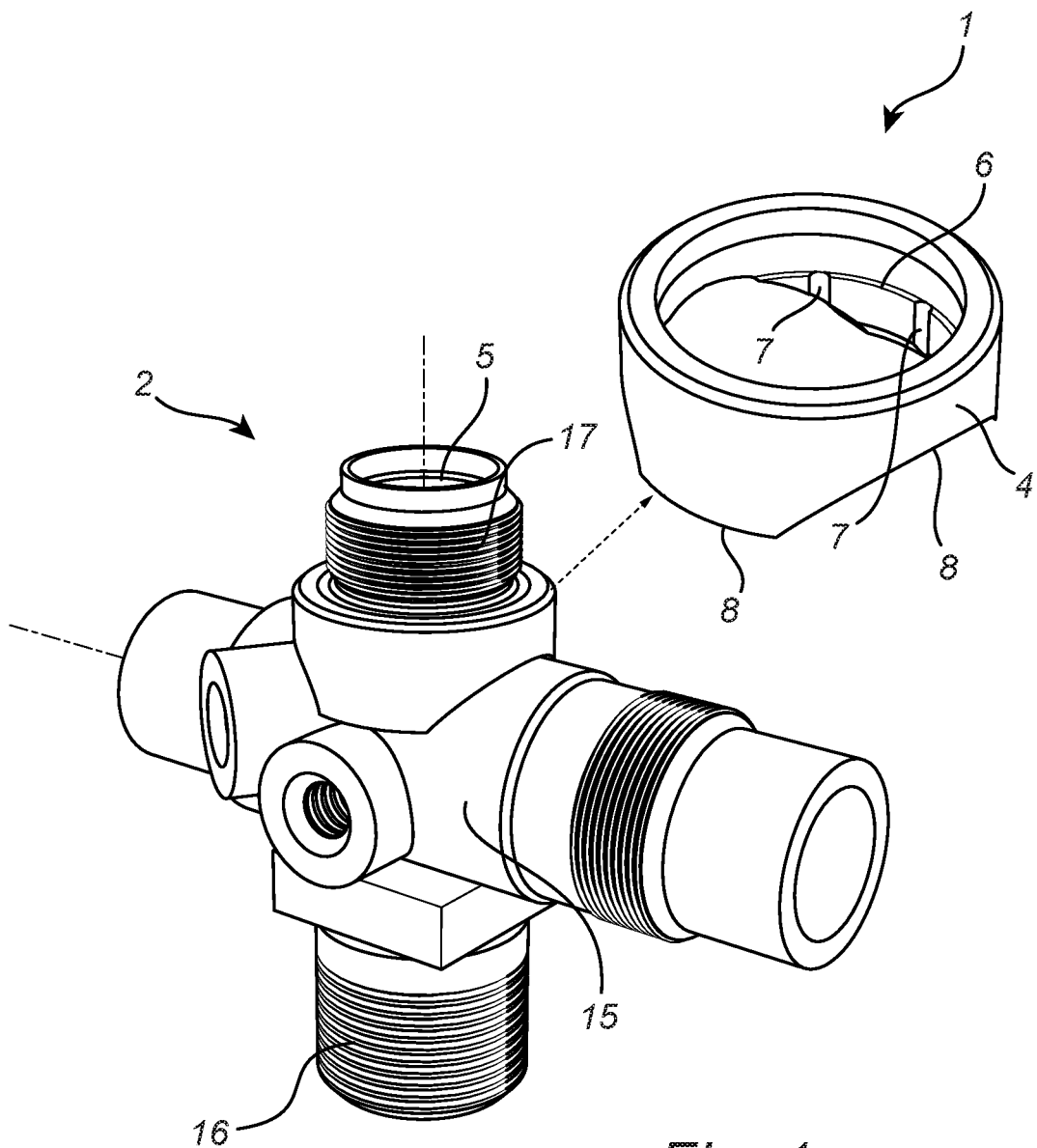
FIG. 1 is a perspective view of one exemplary embodiment of a protective valve ring according to a first aspect of the invention to be applied to a cylinder valve.

FIG. 1 illustrates an exemplary embodiment of a protective valve ring 1 when applied to a shut-off cylinder valve 2 of an oxygen gas cylinder 3. The protective valve ring 1 has a body 4 which encloses an outlet 5 of the shut-off cylinder valve 2. The body 4 is solid and made from an incombustible and heat absorbing material. This means that the protective valve ring 1 is attached to the cylinder valve 2 upon manufacture of the same.

In the enlarged portion of FIG. 1, the protective valve ring 1 is illustrated in more detail and it can be seen that the body 4 further comprises an internal shaping which is designed to guide any potential oxygen gas leak away from inflammable parts of the gas cylinder 3. The internal shaping comprises a first groove 6 extending along the inner circumference of the body 4. The internal shaping further comprises plurality of second grooves 7 extending from a bottom portion of the body 2 in the axial direction thereof up and into the first groove 6 of the body 2. The first groove 6 and the plurality of second grooves 7 are thereby in gas communication with each other.

The body 2 is further equipped with abutting surfaces 8 which are in direct communication with the shut-off cylinder valve 2. The abutting surfaces 8 are made from a heat absorbing material and thus adapted to lead heat away from exposed parts of the gas cylinder 3.

The protective valve ring 1 will both redirect the flames and absorb the heat of a potential fire. In particular, it will protect the plastic guard 9 of the cylinder valve 2 from the flames of the fire which greatly reduces the fuel available to the fire.

In FIG. 2 to FIG. 7, different exemplary embodiments of the protective valve ring 1 are illustrated. In these embodiments, the protective valve ring 1 is made from a first part 10 and a second part 11. This way, the protective valve ring 1 can be applied onto products already in operation.

Figure 2:
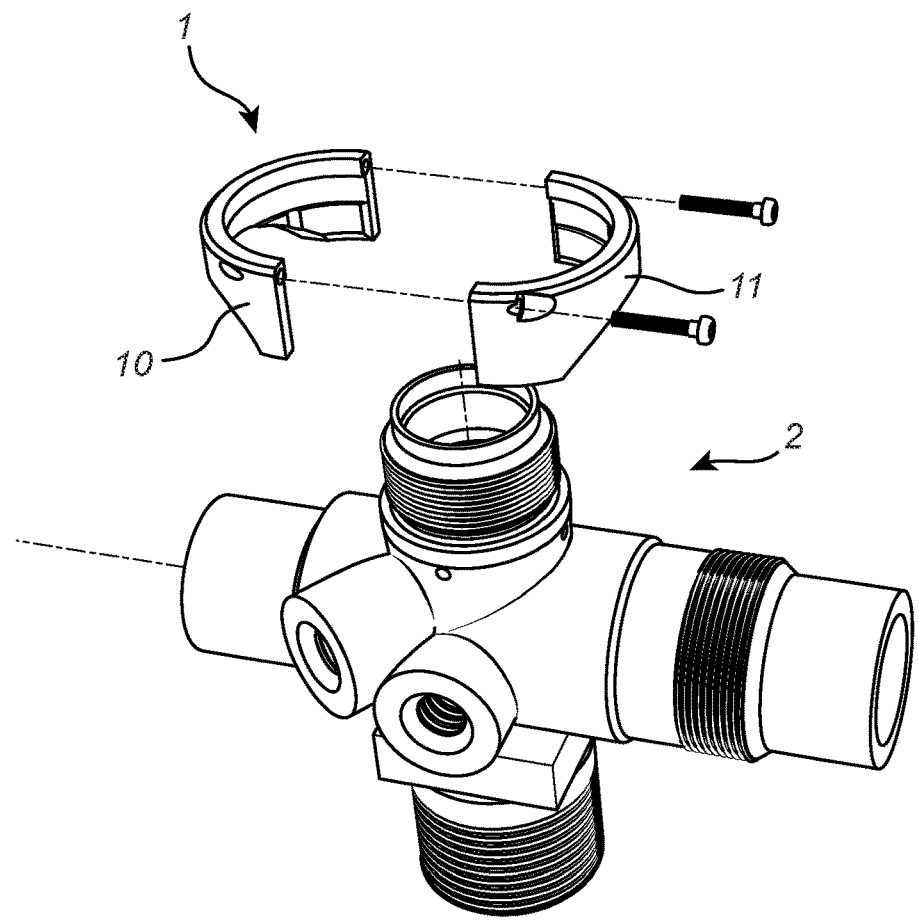
FIG. 2 is a perspective view of another exemplary embodiment of the protective valve ring according to the first aspect of the invention to be applied to the cylinder valve.
Figure 3:
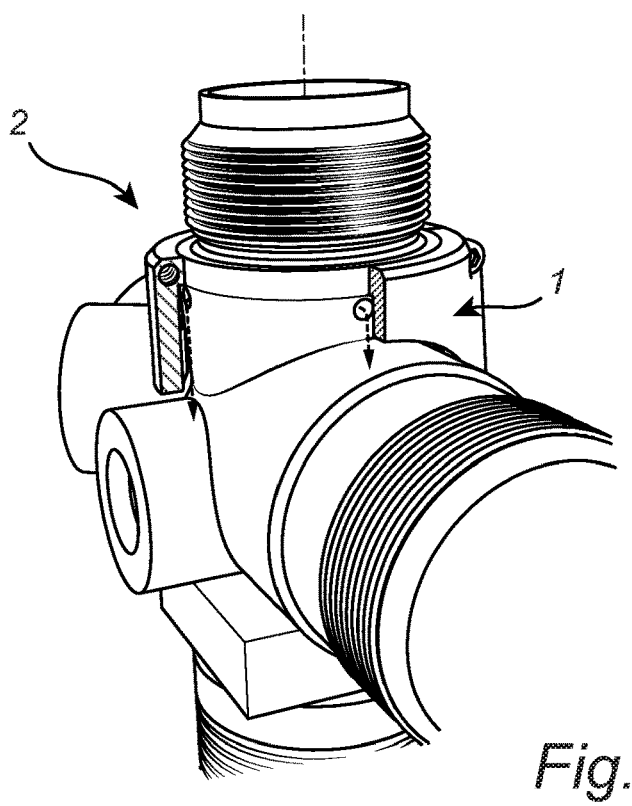
FIG. 3 is a perspective view of the protective valve ring in FIG. 2 when applied to the cylinder valve.

In the embodiment illustrated in FIG. 2 and FIG. 3, the first part 10 of the protective valve ring 1 and the second part 11 of the protective valve ring 1 are screwed together when applied to the shut-off cylinder valve 2.

Figure 4A:
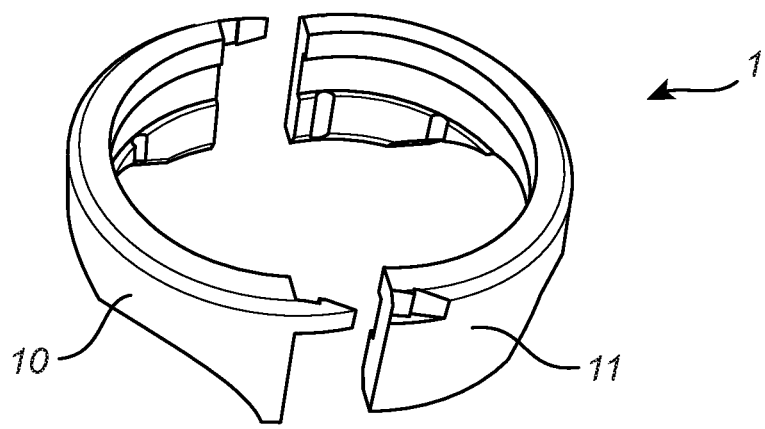
FIG. 4a is a perspective view of yet another exemplary embodiment of the protective valve ring according to the first aspect of the invention in an opened state.
Figure 4B:
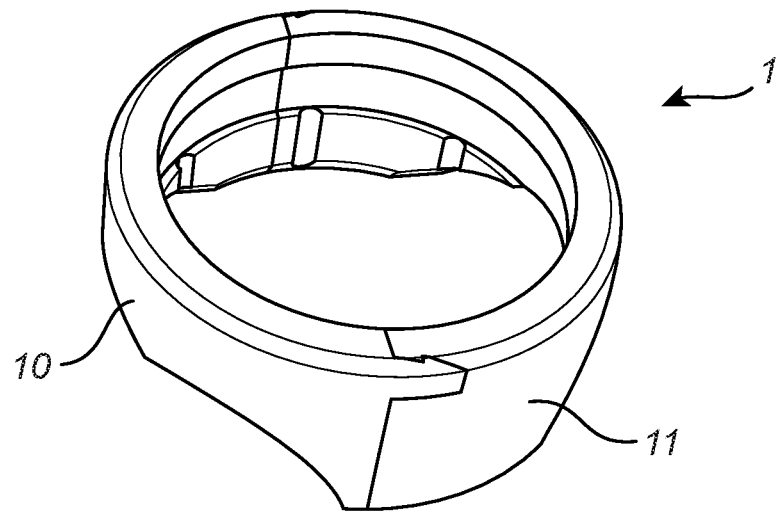
FIG. 4b is a perspective view of the protective valve ring in FIG. 4a in a closed state.

FIGS. 4a and 4b illustrate an embodiment of the protective valve ring 1 in which the first part 10 is connected to the second part 11 by means of a click-function.

Figure 5:
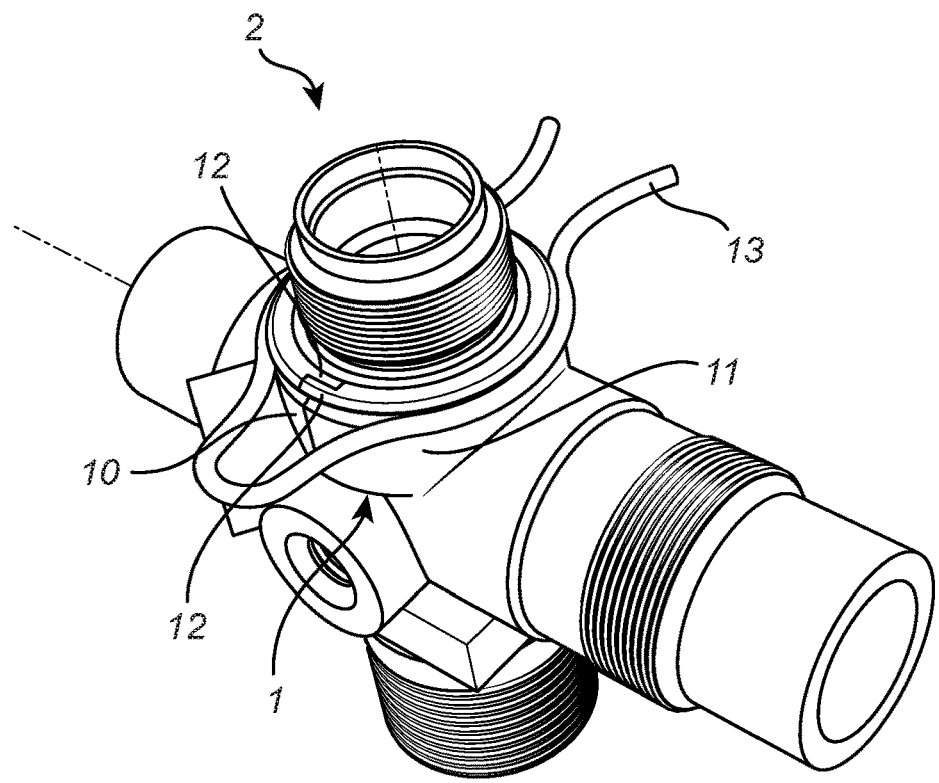
FIG. 5 is a perspective view of one exemplary embodiment of a protective valve ring according to the first aspect of the invention when applied to the cylinder valve.

In the embodiment illustrated in FIG. 5, the first part 10 of the protective valve ring 1 and the second part 11 of the protective valve ring 1 are equipped with flanges 12 for engagement with each other. A clip 13 is arranged in an outer groove extending along the circumference of the protective valve ring 1 in order to hold the parts 10, 11 together.

Figure 6:
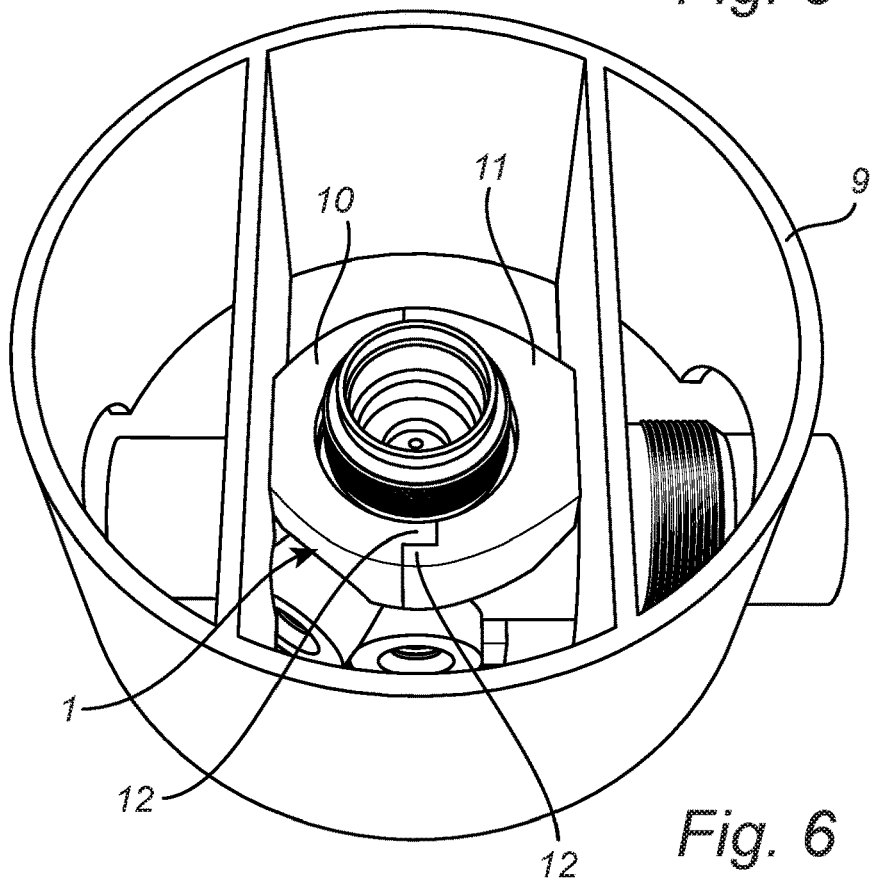
FIG. 6 is a perspective view of yet another exemplary embodiment of a protective valve ring according to the first aspect of the invention when applied to the cylinder valve.

FIG. 6 illustrates an embodiment in which the first part 10 of the protective valve ring 1 and the second part 11 of the protective valve ring 1 are equipped with flanges 12 for engagement with each other. Here, it is the plastic valve guard 9 that is used to hold the parts 10, 11 together.

Figure 7A:
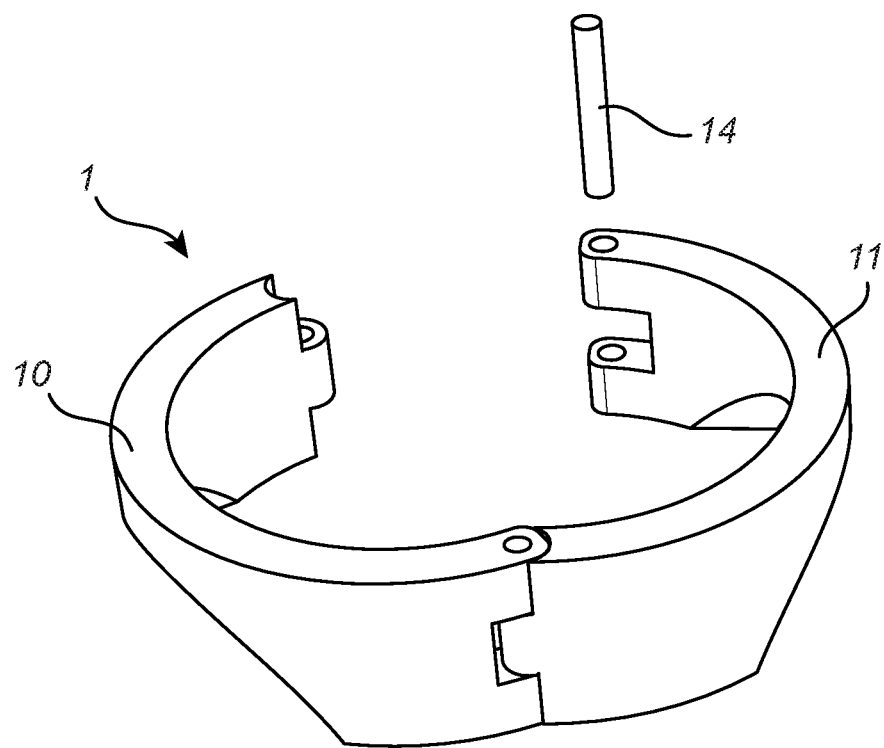
FIG. 7a is a perspective view of yet another exemplary embodiment of a protective valve ring according to the first aspect of the invention in an opened state.
Figure 7B:
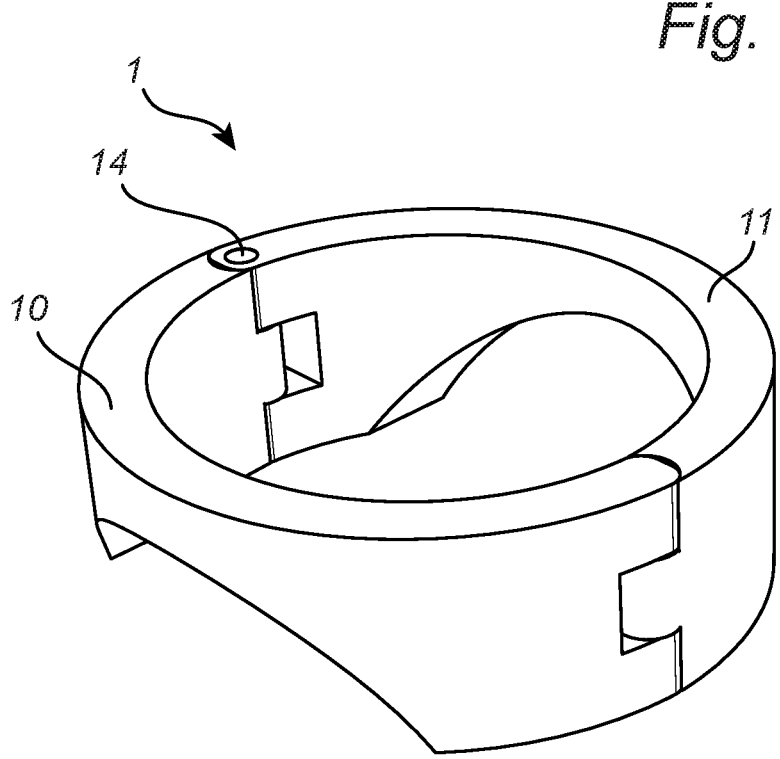
FIG. 7b is a perspective view of the protective valve ring in FIG. 4a in a closed state.

In the embodiment illustrated in FIG. 7a and FIG. 7b, one end of the first part 10 of the protective valve ring 1 is hinged together with one end of the second part 11 of the protective valve ring 1. The other end of the first part 10 is connectable to the other end of the second part 11 by means of a pin element 14.

The actual shut-off valve 2, onto which the protective valve ring 1 is attached, is illustrated in FIG. 1, FIG. 2, FIG. 3 and FIG. 5. The shut-off valve 2 comprises a body 15 defining a passage extending between a gas inlet channel 16 and a gas outlet channel 17, and a sealing element (not shown) arranged to, in a first position, close the passage, and in a second position, open the passage to allow gas to flow between the gas inlet channel 16 and the gas outlet channel 17 through the passage. The protective valve ring 1 is attached to an outlet 5 of the gas outlet channel 17.

The skilled person realizes that a number of modifications of the embodiments described herein are possible without departing from the scope of the invention, which is defined in the appended claims.

For instance, the grooves 6, 7 of the internal shaping may have any suitable type of shape and extension as long as they serve the purpose of leading any potential oxygen leak away from the cylinder valve 2.

The invention claimed is:

1. A protective valve ring (1) for an oxygen gas cylinder (3), comprising:
a body (4) adapted to enclose an outlet (5) of a cylinder valve (2) of the oxygen gas cylinder, wherein the body (4) comprises an internal shaping that includes a first groove (6) extending along an inner circumference of the body (4) and at least one second groove (7) extending along an inner circumference of the body (4) from a bottom portion of the body (4) in an axial direction thereof to the first groove (6) of the body (4), and wherein the internal shaping is configured to guide any potential oxygen gas leak from the oxygen gas cylinder (3) upward through the at least one second groove (7), into the first groove (6), and away from portions of the gas cylinder (3) disposed above the body.

2. The protective valve ring (1) according to claim 1, wherein the first groove (6) and the at least one second groove (7) of the internal shaping are arranged on an inner wall surface of the body (4).

3. The protective valve ring (1) according to claim 2, wherein the internal shaping comprises abutting surfaces (8) for communication with the cylinder valve (2), the abutting surfaces (8) being adapted to absorb heat.

4. The protective valve ring (1) according to claim 2, wherein the body (4) is made from a first part (10) and a second part (11), and wherein a first end of the first part (10) is hinged together with a first end of the second part (11).

5. The protective valve ring (1) according to claim 4, wherein a second end of the first part (10) is connectable to a second end of the second part (11) by means of a pin element or a snap lock.

6. A shut-off valve for (2) controlling flow of a pressurized gas, comprising a body (15) defining a passage extending between a gas inlet channel (16) and a gas outlet channel (17), and a sealing element arranged to, in a first position, close the passage, and in a second position, open the passage to allow gas to flow between the gas inlet channel (16) and the gas outlet channel (17) through the passage, further comprising the protective valve ring (1) according to claim 2, which is attached to the outlet (5) of the gas outlet channel (17).

7. The protective valve ring (1) according to claim 1, wherein the first groove (6) and the at least one second groove (7) are in gas communication with each other.

8. The protective valve ring (1) according to claim 7, wherein the internal shaping further comprises abutting surfaces (8) for communication with the cylinder valve (2), the abutting surfaces (8) being adapted to absorb heat.

9. The protective valve ring (1) according to claim 7, wherein the body (4) is made from a first part (10) and a second part (11), and wherein a first end of the first part (10) is hinged together with a first end of the second part (11).

10. The protective valve ring (1) according to claim 9, wherein a second end of the first part (10) is connectable to a second end of the second part (11) by means of a pin element or a snap lock.

11. A shut-off valve for (2) controlling flow of a pressurized gas, comprising a body (15) defining a passage extending between a gas inlet channel (16) and a gas outlet channel (17), and a sealing element arranged to, in a first position, close the passage, and in a second position, open the passage to allow gas to flow between the gas inlet channel (16) and the gas outlet channel (17) through the passage, further comprising the protective valve ring (1) according to claim 7, which is attached to the outlet (5) of the gas outlet channel (17).

12. The protective valve ring (1) according to claim 1, wherein the internal shaping further comprises abutting surfaces (8) for communication with the cylinder valve (2), the abutting surfaces (8) being adapted to absorb heat.

13. The protective valve ring (1) according to claim 12, wherein the body (4) is made from a first part (10) and a second part (11), and wherein a first end of the first part (10) is hinged together with a first end of the second part (11), and wherein a second end of the first part (10) is connectable to a second end of the second part (11) by means of a pin element or a snap lock.

14. A shut-off valve for (2) controlling flow of a pressurized gas, comprising a body (15) defining a passage extending between a gas inlet channel (16) and a gas outlet channel (17), and a sealing element arranged to, in a first position, close the passage, and in a second position, open the passage to allow gas to flow between the gas inlet channel (16) and the gas outlet channel (17) through the passage, further comprising the protective valve ring (1) according to claim 12, which is attached to the outlet (5) of the gas outlet channel (17).

15. The protective valve ring (1) according to claim 1, wherein the body (4) is solid.

16. The protective valve ring (1) according to claim 1, wherein the body (4) is made from a first part (10) and a second part (11), and wherein a first end of the first part (10) is hinged together with a first end of the second part (11).

17. The protective valve ring (1) according to claim 16, wherein a second end of the first part (10) is connectable to a second end of the second part (11) by means of a pin element or a snap lock.

18. A shut-off valve for (2) controlling flow of a pressurized gas, comprising a body (15) defining a passage extending between a gas inlet channel (16) and a gas outlet channel (17), and a sealing element arranged to, in a first position, close the passage, and in a second position, open the passage to allow gas to flow between the gas inlet channel (16) and the gas outlet channel (17) through the passage, further comprising the protective valve ring (1) according to claim 1, which is attached to the outlet (5) of the gas outlet channel (17).

19. The protective valve ring (1) according to claim 1, wherein the body (4) is annular.

20. A method for attaching a protective valve ring (1) to a shut-off cylinder valve (2) of an oxygen gas cylinder (3), the protective valve ring (1) comprising a body (4) adapted to enclose an outlet (5) of the cylinder valve (2), the body (4) comprising internal shaping adapted to guide a potential oxygen gas leak away from inflammable parts of the gas cylinder (3), wherein the method comprises the steps of:
  arranging a first part (10) and a second part (11) of the body (4) around the outlet (5) of the cylinder valve (2), wherein a first end of the first part (10) is hinged together with a first end of the second part (11), and
  locking a second end of the first part (10) together with a second end of the second part (11) by means of a pin element (14) or a snap lock.

* * * * *